(12) United States Patent
Kaiser

(10) Patent No.: US 7,328,825 B2
(45) Date of Patent: Feb. 12, 2008

(54) SECURED DYNAMIC STORAGE COMPARTMENT FOR VEHICLE DOOR

(76) Inventor: Dolores Kaiser, 336 Golfview Rd. Apt. 1001, North Palm Beach, FL (US) 33408

(*) Notice: Subject to any disclaimer, the term of this patent is extended or adjusted under 35 U.S.C. 154(b) by 542 days.

(21) Appl. No.: 10/773,525

(22) Filed: Feb. 5, 2004

(65) Prior Publication Data

US 2005/0284907 A1   Dec. 29, 2005

(51) Int. Cl.
*B60R 7/00* (2006.01)
*B60R 9/00* (2006.01)
*B60R 11/00* (2006.01)
*B65D 6/00* (2006.01)
*B60N 3/12* (2006.01)

(52) U.S. Cl. .................. 224/543; 224/542; 224/551; 224/544; 224/539; 224/482; 220/8; 296/37.13

(58) Field of Classification Search ............... 224/543, 224/542, 551, 544, 539, 553, 482; 220/8; 296/37.16, 37.13, 37.14
See application file for complete search history.

(56) References Cited

U.S. PATENT DOCUMENTS

| | | | | |
|---|---|---|---|---|
| 4,014,416 A * | 3/1977 | Golden | ...................... | 206/315.1 |
| 4,017,005 A * | 4/1977 | Forbes, Jr. | ................... | 222/47 |
| 4,138,154 A * | 2/1979 | McKeon | ....................... | 296/98 |
| 4,717,196 A * | 1/1988 | Adams | ......................... | 296/96 |
| 4,854,430 A * | 8/1989 | Peterson | ...................... | 190/105 |
| 5,072,983 A * | 12/1991 | Muroi et al. | .............. | 296/37.13 |
| 5,513,580 A * | 5/1996 | Franks | ......................... | 109/51 |
| 6,196,605 B1 * | 3/2001 | Baldas et al. | ............. | 296/37.13 |
| 6,648,166 B2 * | 11/2003 | Levy | ............................ | 220/520 |
| 2004/0000798 A1 * | 1/2004 | Royer | ......................... | 296/98 |

* cited by examiner

*Primary Examiner*—Nathan J. Newhouse
*Assistant Examiner*—Lester L. Vanterpool
(74) *Attorney, Agent, or Firm*—McHale & Slavin, P.A.

(57) ABSTRACT

This application is directed to a dynamic storage compartment for modifying the interior space of a vehicle, either as originally equipped or as an after-market modification, so as to provide a means for providing enhanced storage capacity for a vehicle which is characterized by ease of use and the ability to provide secure out of sight storage for valuables.

14 Claims, 10 Drawing Sheets

SECURED DYNAMIC STORAGE COMPARTMENT FOR VEHICLE DOOR

FIELD OF THE INVENTION

This invention relates to storage compartments, and particularly relates to storage compartments designed to utilize space within an automobile door or the like moving vehicle, and more particularly to a door mounted storage device capable of movement in response to a door window position.

BACKGROUND OF THE INVENTION

It is customary in many cases for a middle arm rest of the front seat of a vehicle to be used as a storage compartment or provided with areas where articles may be placed or deposited. In particular, cup and can holders, ashtrays or oddments trays are often fastened to the front end of the arm rest. When not in use, they may be inserted into the arm rest to eliminate risks of injury and avoid clutter. Door panels are often provided with small pockets for holding maps or small items. Door armrests may be provided with a hinged upper portion to facilitate storage of small oddments or maps.

In airplanes all handbags and pocketbooks must be stored either in the overhead compartment or under the forward seat. Such precautions are necessary because they can become missiles in the event of severe turbulence or a crash. In airplanes, the greatest risk is during take-off and landing but in car travel the risk of accident is continuous. The need to store pocketbooks is therefore continuous.

However, within the limited interior space of most vehicles, especially those constructed without a middle armrest, typically there are not provisions for storage of larger articles such as a women's handbag. Handbags are often placed on top of a seat within the passenger compartment or they are dropped into the floor area for storage during driving. These unsecured articles may create a dangerous condition in the event of an accident, wherein they may act as projectiles flying though the air.

Women have long sought for a place to store their handbags to be conveniently available when needed. There are inumerable examples of working women and stay at home moms taking their children to school or elsewhere and passing a drive-in to pick up coffee, a soda, dinner or a snack. The handbag is often in the back seat and a hassle ensues to retrieve it. The same is true when passing a toll booth. No storage area exists that is specifically constructed to accommodate a handbag.

In addition, theft of personal articles from automobiles is an ever-growing problem. The use of vehicle alarms, while of benefit in reducing the number of actual vehicle thefts, is of little value in reducing the number of so-called "smash & grab" robberies. These robberies are events of opportunity, often precipitated by the perpetrator's ability to view the object of their desire, at which point they can quickly break in, grab the merchandise, and quickly get away, before the tripping of an alarm device becomes a matter of any consequence.

What is lacking in the art is a device for securely and inconspicuously storing valuable items, such as a woman's handbag, within an automobile door cavity so as to provide convenience, increase safety and reduce the likelihood of theft. The storage space should provide some degree of side impact shock absorption and the storage space should provide some dis-incentive to break into a car for valuables.

DESCRIPTION OF THE PRIOR ART

Various attempts have been made in the prior art to develop means for storing personal items in a manner to provide personal convenience and to keep the stored articles out of view.

For example, Barker, U.S. Pat. No. 4,023,873, discloses a combination armrest, trash receptacle, ashtray and cash container formed from an elongated rectangular member having a horizontal top forming an arm rest. The horizontal section is provided with a hinge rod and the horizontal member having three separate doors hinged to the rod so that the three compartments therein can be separately opened.

Laesch, U.S. Pat. No. 5,613,723, discloses a storage armrest mounted on a vehicle door. The storage armrest includes a door hingedly mounted thereon, with a hold-open device integrally molded on the door and in the storage compartment. The hold-open device includes a substantially one-fourth circle cam molded on an inner surface of the door, and a flex finger molded on an upper surface of the storage compartment. The flex finger serves to hold the door open until manually forced downwardly, thereby bending the flex finger while the cam moves therepast to allow the door to be closed.

Ramanujam, U.S. Pat. No. 5,967,594, discloses a vehicle door structure having an armrest which is retractable such that it projects into the vehicle when the door is closed and is retracted against the door when the door is open.

Johnson et al, U.S. Pat. No. 6,161,896, disclose a storage system for an automotive vehicle which is preferably deployed underneath the rear seat structure, for example, below the seat bottom structure. The storage system can include any number and combination of selectively operable sliding trays, pivoting trays, collapsible trays, pivoting lids, storage bins, and track systems.

Radcliffe, U.S. Pat. No. 4,832,241, discloses a vehicle portable-office organizer designed to be detachably mounted to the passenger seat of a vehicle.

Various patents are directed to center consoles located between the driver and passenger seats. These patents include U.S. Pat. Nos. 6,419,314, 6,264,261, 5,076,641, 6,135,529, 6,033,015, 4,417,764, and 6,497,441.

Scheerhorn, U.S. Pat. No. 6,419,314, discloses a center console armrest storage compartment which includes a hinged cover assembly including a base hinged to the storage compartment and a cover slidably mounted to the base by a slide assembly. The slide assembly, in one embodiment, includes a U-shaped rod which is secured to the base and a pair of sleeves mounted to the cover with a polymeric slide material extending between the rod and sleeves to allow the cover to slide forwardly and aft with respect to the base. In a preferred embodiment, the base, when uncovered by moving the cover forwardly, includes a storage tray, cup holder or other accessory, which is stacked above the storage compartment.

De Angelis et al., U.S. Pat. No. 6,135,529, disclose a multi-position sliding center console for a vehicle and a guide member for mounting the console to the vehicle. The center console is of the type including at least one storage compartment and an associated lid. The guide member defines a reciprocal path from a first end of the guide to a second end of the guide. The first end of the guide is adjacent a set of front passenger seats and the second end of the guide is adjacent a set of rear passenger seats. A carriage is operatively coupled between the console and the guide member for slidably moving the console on the guide member along the reciprocal path between the front and rear passenger seats.

Krafcik, U.S. Pat. No. 6,264,261, discloses a vehicle console which is adapted to store a child safety seat and is further adapted to operatively and movably support and position the child safety seat within the vehicle. The console includes a pair of child seat attachment members which removably connect the child safety seat to the console, and a lip or flange portion which allows the child safety seat to be securely supported by the console when deployed within the vehicle.

Lindberg, U.S. Pat. No. 5,076,641, discloses a center console vehicle armrest which includes a storage compartment formed therein and having a cover which opens in two directions to increase accessibility to the inside of the compartment. A preferred embodiment includes an intermediate ring pivotally coupled to the cover and to the compartment and latches for allowing the cover and ring to pivot open in one direction and the cover to pivot open in another direction Husted, U.S. Pat. No. 6,033,015, discloses an armrest assembly comprising a bin defining a storage compartment and a cover hinged to the bin for movement between open and closed positions. A shaft rotatably supports the cover on the bin for pivotal movement of the cover relative to the bin. A helical torsion spring is coiled about the shaft and has one end reacting with the bin and the other end reacting with the cover for continuously urging the cover to the open position. A detent, having at least one caming surface, is disposed on the shaft for engaging the bin and is rotatable with the cover for retaining the cover in at least one detent position. The detent is located between the bin and the spring. Accordingly, the spring continuously biases the detent axially against the bin and also continuously biases the cover to the open position.

Bargiel, U.S. Pat. No. 6,508,508, discloses an armrest storage unit comprising a compartmentalized pullout armrest assembly which includes a cover, an armrest storage compartment, and a seat cushion with an understorage compartment. The armrest storage compartment includes maneuverable dividers for changing the storage compartment as desired, a removable coin holder and a power supply. The armrest assembly can be positioned to provide a third seat.

Marcus et al., U.S. Pat. No. 4,417,764, disclose an armrest for a vehicle which integrally includes a drawer having a holder for different types and sizes of beverage containers. The drawer is releasably secured within a compartment, integral with the armrest, and includes a floor having an aperture therethrough for receiving generally cylindrical objects such as cups. U-shaped legs are pivotally mounted under the floor to be positioned below the apertures to support the bottom of a cylindrical container. In the preferred embodiment the compartment further includes a slide with recesses for holding a writing instrument and writing media such that the slide forms a support for writing on the media.

Mahmood et al., U.S. Pat. No. 6,497,441, disclose a multipurpose console for use in a vehicle having a support structure having an internal compartment, a latching mechanism being fixedly secured to a lower surface of the support structure and providing a means for releasably engaging a mounting member of the vehicle. The internal compartment has a lid pivotally secured to an upper portion of the support structure and moves between a first position and a second position. The lid covers the internal compartment when the lid is in the first position and the lid has an upper portion and a lower portion. The upper portion is pivotally secured to the lower portion for movement between the first position and the second position. The upper portion and the lower portion define a surface area for changing a child's diaper when the upper portion is in the second position. The internal compartment provides a plurality of storage areas for products necessary to facilitate the changing of the child's diaper. The multipurpose console also includes an electronic entertainment device.

Prior art patents which are directed to door-mounted storage armrests (U.S. Pat. Nos. 3,104,131, 4,023,873 and 5,613,723) do not disclose storage compartments which extend into the vehicle door cavity to provide a deeper storage area. The instant invention satisfies a long-felt need for adequate and accessible vehicle storage by providing a device which is designed to be placed in a recessed position within the vehicle door cavity, thereby taking advantage of the increased depth thus obtained.

SUMMARY OF THE INVENTION

The present invention provides means for expanding the usable interior space of a vehicle, either as original equipment installed by the manufacturer or as an after-market modification, so as to provide a means for providing storage capacity for a vehicle which is characterized by ease of use and the ability to provide secure storage for women's handbags.

To achieve this result, the instant invention utilizes the interior space of a vehicle door. The invention utilizes the space within the vehicle door and still accommodates the opening of the car window. This is accomplished by having a box within a box, the inner box being slightly smaller, which pushes forward one half inch to accommodate the window as it comes down upon opening. There are small covered springs attached to the outer frame, at each corner of the outer box, which springs are attached to the inner box, keeping the two boxes aligned and providing some energy to push the inner box back into the door cavity as the window is raised. The exterior covering of the outer box is a reinforced pleated vinyl or leather in conformity with the cars interior. The material and pleats provide for expansion as well as the side flaps.

The storage compartment has, opposite sides, a top and a bottom for connecting peripheral portions of a front and a back panel member so that the panel members face each other to form front and back inner boundaries of an interior portion of the storage compartment, a interior portion which is preferably accessible from the top side or front side of the storage compartment. The interior portion of the storage compartment may also include padding to further protect the stored items.

The construction of the storage compartment facilitates storage of many different sizes and types of articles, e.g. a make-up bag, handbag, pocket book, writing instruments, smoker's requisites, a headset or the like. In an advantageous development of the invention, the storage compartment is provided with a closable covering means illustrated generally as a flap, roller blind or lid. The covering means is advantageously capable of pivoting about an axis at the edge of the recess, or winding around an axis in combination with a spring retraction mechanism, wherein the point at which the axis is provided is preferably at or along the edge of the storage area in which is situated for placement of articles within the storage compartment. In addition, the covering means is preferably latchable such that articles may be secured so that they remain in position, particularly in the event of an accident. In this manner, the contents of the storage compartment are fixed in position and, particularly in the event of an accident, the risk of injury from flying articles or as a result of impact with hard inner surfaces of the storage compartment is avoided. Thus, the covering means in the present invention is a device for safeguarding the contents of the storage compartment.

It is also conceivable to design the storage compartment as a shock absorber which may be used to cushion side impacts of the vehicle. In this embodiment the outside of the roller blind or lid may be provided with a covering and, optionally, a thin layer of padding. The visual appearance of the storage compartment is also enhanced in this manner.

Accordingly, it is a primary objective of the instant invention to provide enhanced vehicle storage capacity by utilizing the heretofore unused space within a vehicle's door by way of provision of a dynamic receptacle for accommodating bulky items, such as women's handbags therein.

It is a further objective of the instant invention to provide enhanced and coverable storage capacity which places articles within the vehicle out of view, so as to reduce the incidence of theft.

It is yet another objective of the instant invention to provide in-door storage the volume of which is adjustable as a function of window position.

Still another objective of the instant invention is to provide an additional, easily accessible storage compartment useful for women's handbags.

Still yet another objective of the instant invention is to provide a storage compartment utilizing space within the vehicle door cavity while the functionality of the window and other equipment contained within the door are retained.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
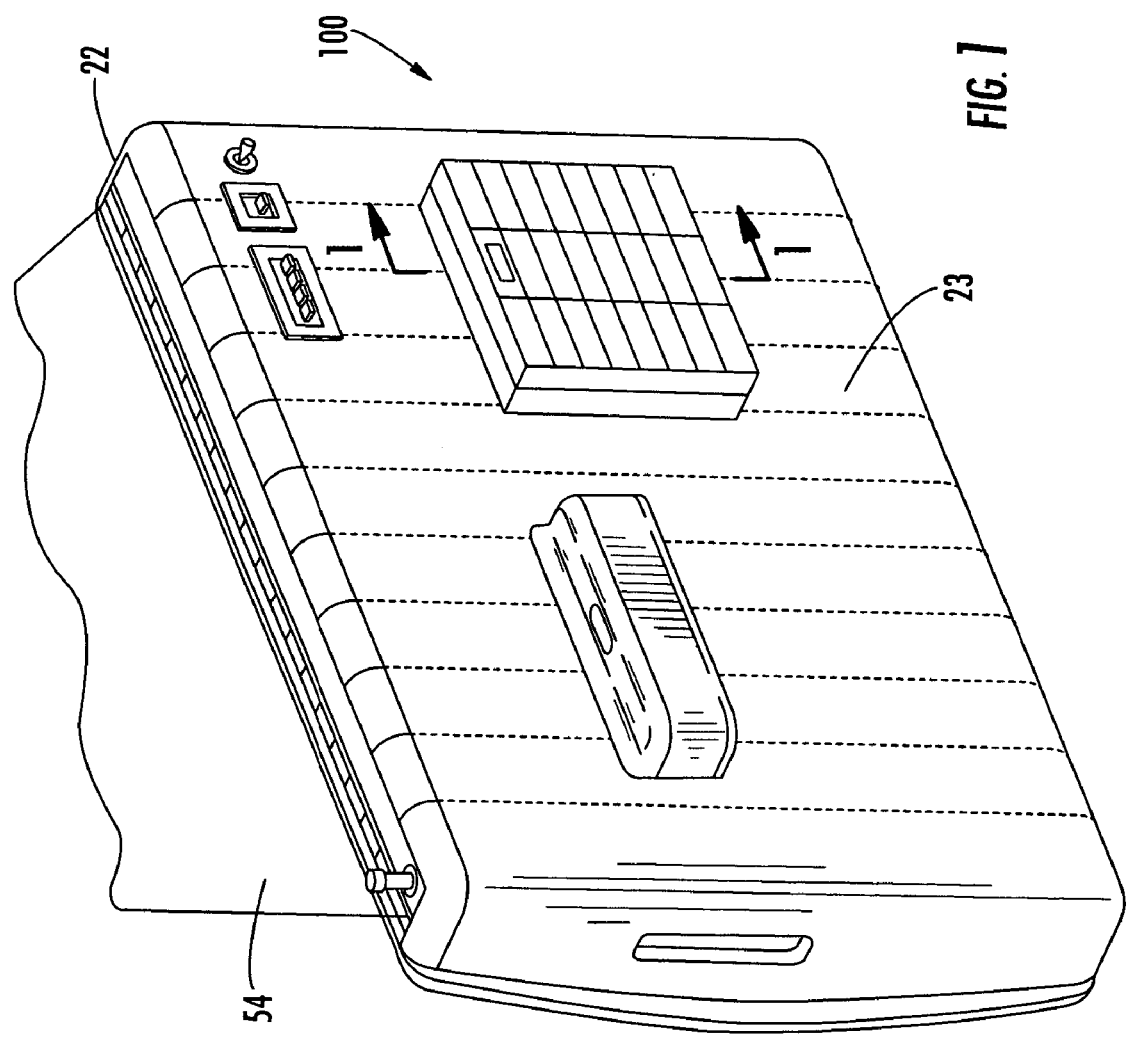
FIG. 1 is a perspective view of a preferred embodiment of the instant invention illustrated secured within a vehicle door.
Figure 2:
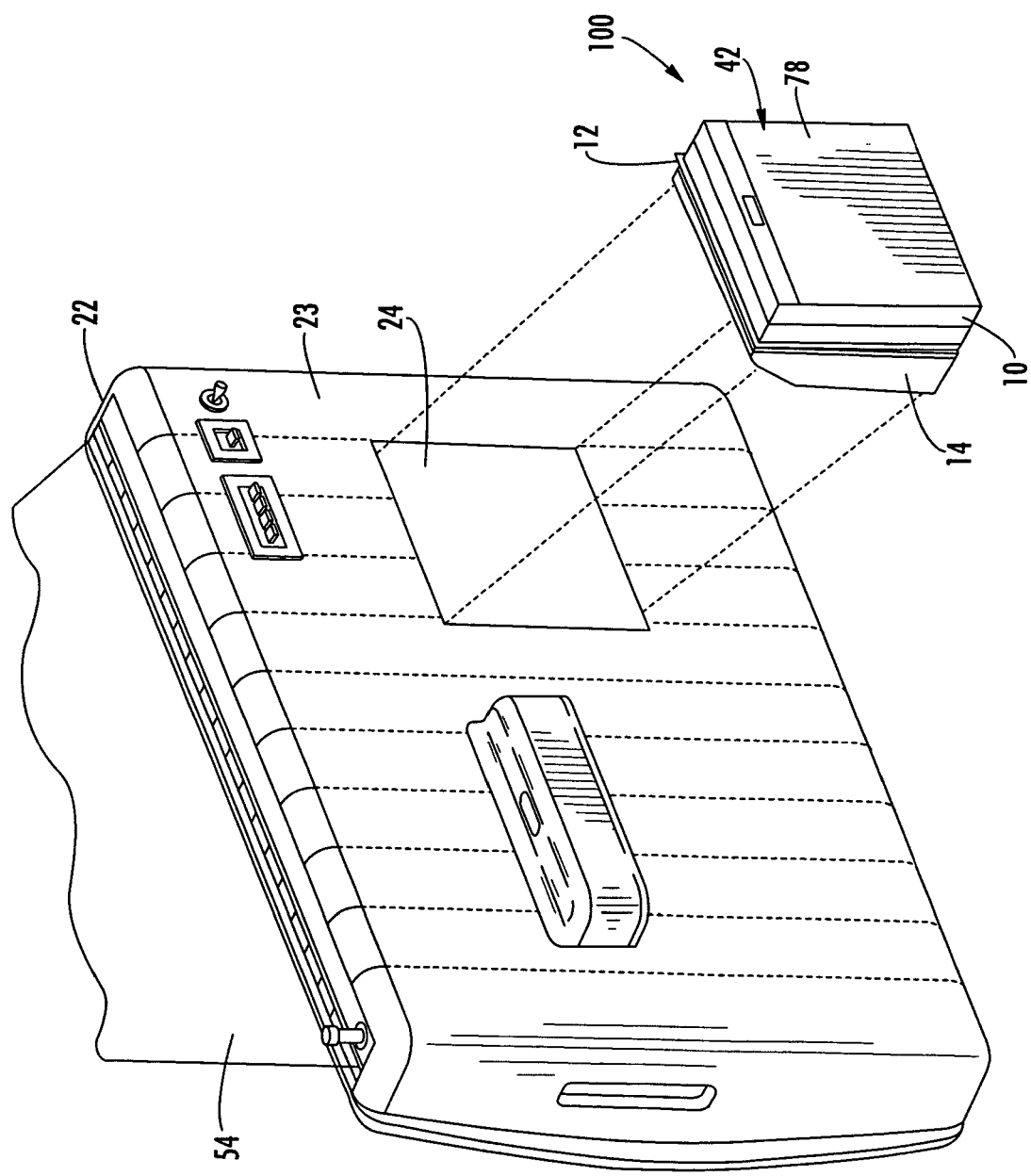
FIG. 2 is a partially exploded view of the preferred embodiment illustrated in FIG. 1.
Figure 4:
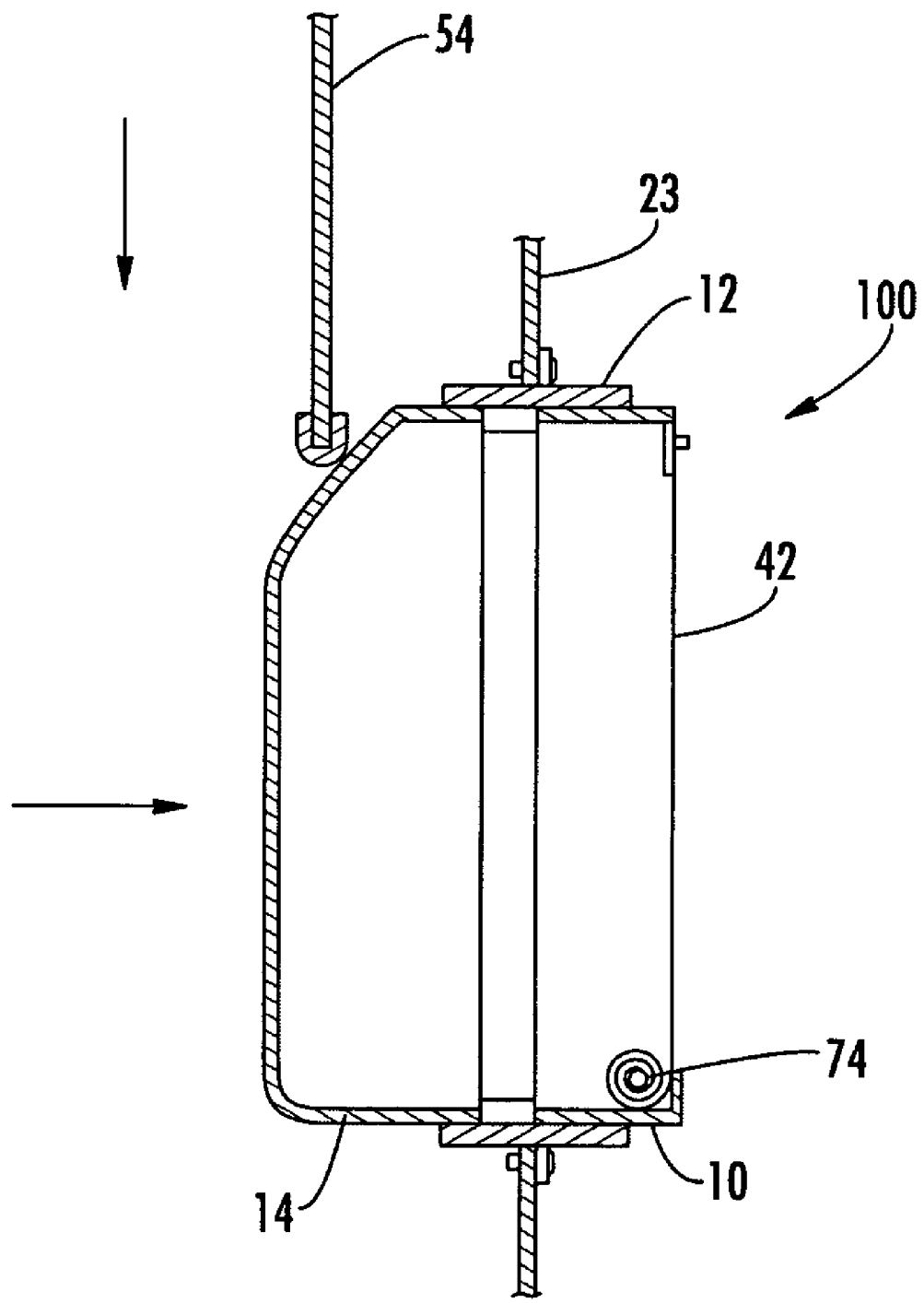
FIG. 4 is section view along lines 1-1 of FIG. 1 illustrating the relative motion of the front and back panels with respect to downward motion of the vehicle window.
Figure 7:
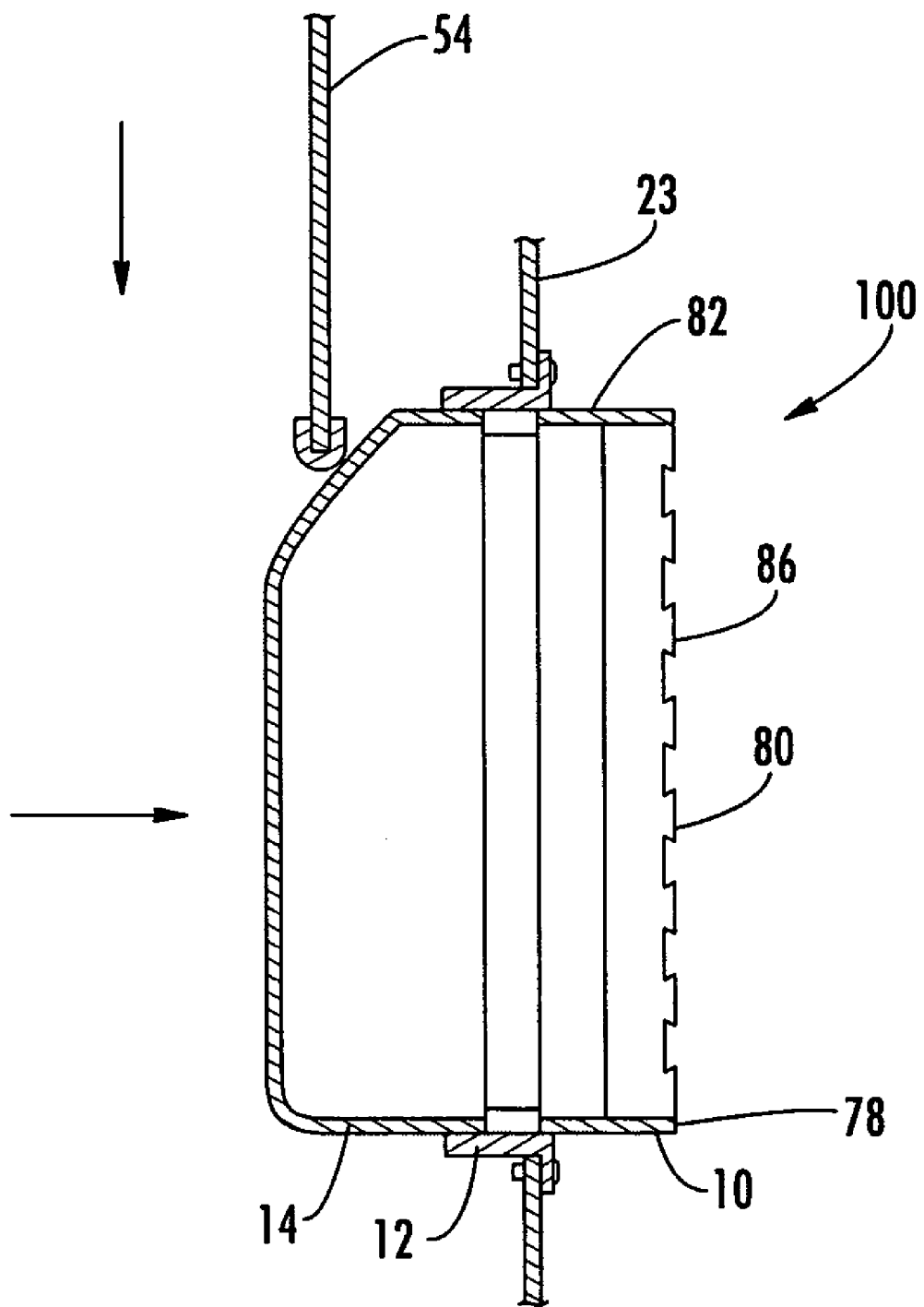
FIG. 7 is section view along lines 2-2 of FIG. 5 illustrating the relative motion of the front and back panels with respect to downward motion of the vehicle window.

The instant invention provides a storage compartment adapted for insertion within and upon an interior panel of a vehicle door. With reference to FIGS. 1 and 2, a storage compartment 100, having a front panel member 10, a back panel member 12 and a center panel member 14 is provided. The storage compartment 100 is constructed and arranged for mechanical engagement within and upon a surface of an interior panel 23 of a vehicle door 22. Neither the interior panel 23 nor the vehicle door 22 constitute a part of the instant invention. Such mechanical engagement can be achieved by any suitable fastening means, for example a combination of brackets, screws, rivets, clips or the like, which are affixed within an interior or hidden portion of the vehicle door panel, at various points where the surfaces come together. Alternatively, it is contemplated that the storage compartment could be provided with integral attachment means, such as deformable tabs (not shown) or the like which would enable secure engagement of the storage compartment 100, upon insertion within said vehicle door panel. Placement of said storage compartment 100 within and upon said interior panel 23, as illustrated, provides a storage area which is at least partially recessed within an interior portion 24 of the vehicle door. Referring to FIGS. 4 and 7, the construction and arrangement of the instant invention is such that it cooperates with the door window 54 to slide the storage area 100 outwardly from the interior area 24 of the door 23 during downward movement of the window and inwardly into the door cavity during upward movement of the window.

Figure 3:
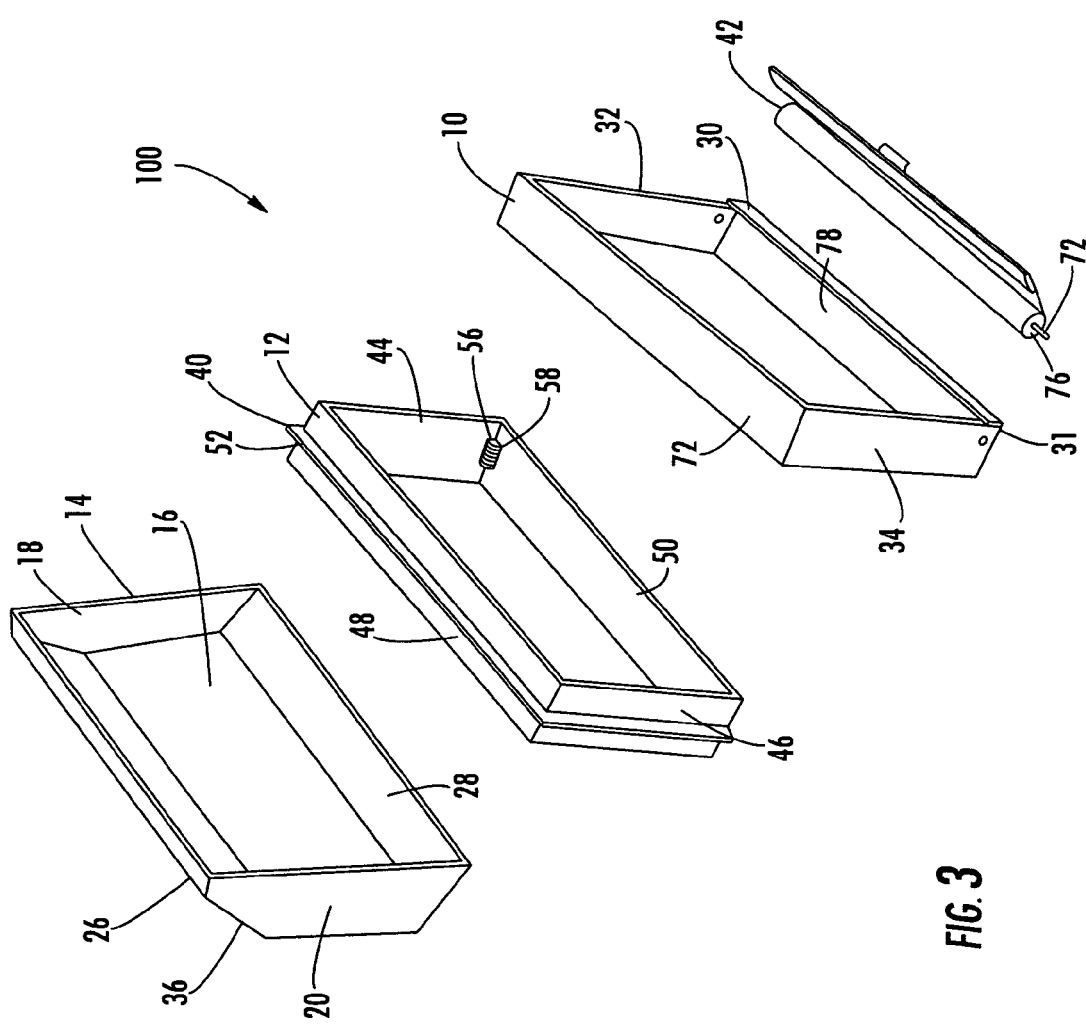
FIG. 3 is an exploded view of the preferred embodiment of the instant invention.

Referring to FIG. 3 illustrating a preferred embodiment of the present invention, the back panel member 14 includes a back surface 16, opposite sides 18 and 20, a top 26 and a bottom 28. The sides, top and bottom each extending generally perpendicular to the back surface 16. In a most preferred embodiment the sides, top and bottom surfaces extend about one and one half inches from the back surface and are constructed and arranged to telescope inwardly and outwardly with respect to the center member 12. The back panel member 14 also includes a means for pressing the back panel member into the center member 12 in a telescoping manner during downward movement of the vehicle door window 54 (FIGS. 4 and 7), illustrated herein as a ramping surface 36. The ramping surface 36 extends between the top 26 and back 16 surfaces to cooperate with the window 54 located within the vehicle door 22. The back panel member 14 also includes a means for pressing back panel member outwardly with respect to the center member 12 and into the door cavity 24 during upward movement of the vehicle door window 54. In the preferred embodiment the means for pressing the back panel member outward includes a plurality of spring members 56 located within spring pockets 58 integrally formed within the center member 12. The back panel member is preferably constructed of a polymeric material by methods well known in the art such as injection molding. The back panel member may also include an integrally formed or securely attached padded surface (not shown) to protect articles stored within the storage compartment.

The front panel member 10 includes a front surface 30 having an aperture 31 therethrough for placing articles within the storage compartment 100, opposite sides 32 and 34, a top 72 and a bottom 78. The front member 10 also preferably includes a covering means 42 movable between a first open position, wherein articles may be placed within the storage compartment, and a second closed position, wherein the covering means is juxtaposed to and covering the aperture 31.

The center member 12 is constructed and arranged for mechanical engagement within and upon a surface of an inner panel 23 of a vehicle door 22. The center member 12 having opposite sides 44 and 46, a top 48 and a bottom 50 for connecting peripheral portions of the front and back panel members 12, 14 so that the panel members face each other to form front and back inner boundaries of an interior portion of the storage compartment. In the preferred embodiment the sides 18 and 20, top 26 and bottom 28 of the back panel member 14 are constructed and arranged to telescope inwardly and outwardly within the sides 44 and 46, top 48 and bottom 50 of the center member 12. Extending at least partially around the perimeter of the center member 12 is a means of attaching the center member to the inner surface of a door panel illustrated herein as a flange 40. The flange preferably includes a plurality of apertures 52 for fasteners well known in the art.

Figure 8:
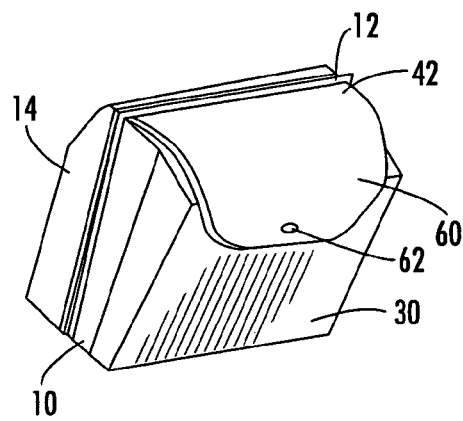
FIG. 8 is a perspective view of an alternative embodiment of the instant invention.

FIGS. 1 through 11 illustrate alternative embodiments of the covering means 42. Referring to FIG. 8, the covering means 42 is illustrated in the form of a flexible flap 60. In this embodiment, the flexible flap is flexibly engaged with the front panel member 10 so as to enable the flap 60 to be lifted to gain access to the interior storage area. The flap may also include a fastening member 62 to releasably engage the front panel member 10. In this embodiment the front surface 30 may be constructed of a flexible material or rigid material or a suitable combination thereof.

Figure 9:
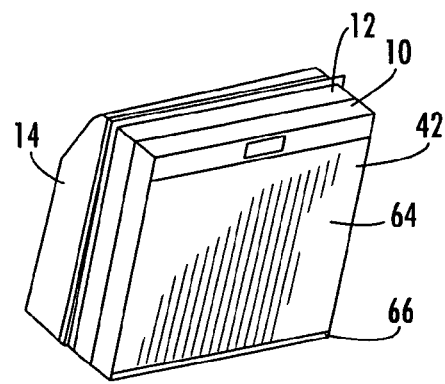
FIG. 9 is a perspective view of an alternative embodiment of the instant invention.

Referring to FIG. 9, the covering means 42 is illustrated in the form of a rigid plate 64. In this embodiment the rigid plate 64 is pivotally connected via a hinge 66 to the front panel member 10 so as to enable the rigid plate 64 to be opened to gain access to the interior storage area.

Figure 10:
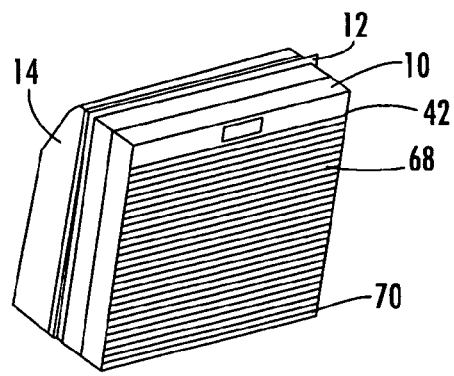
FIG. 10 is a perspective view of an alternative embodiment of the instant invention.

Referring to FIG. 10, the covering means 42 is illustrated in the form of a plurality of narrow elongated rigid elements 68 flexibly connected in an adjacent relationship. The terminal elongated rigid element 70 being flexibly connected to the front panel member 10 so as to enable the covering means to be retracted to a position juxtaposed to the sides 32-34, top 72 or bottom 78 of the front panel member to gain access to the interior storage area.

Figure 11:
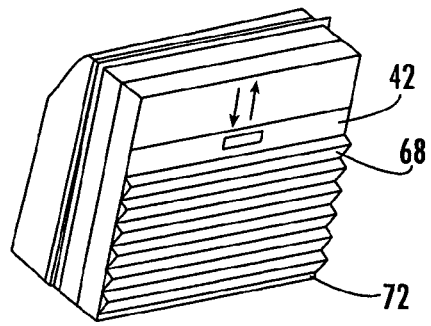
FIG. 11 is a perspective view of an alternative embodiment of the instant invention.

Alternatively, the plurality of narrow elongated rigid elements 68 may be arranged to wind around an axle 72 (FIG. 3) in a series of concentric loops 74 (FIG. 4) in cooperation with a spring retraction mechanism 76 (FIG. 3). Referring to FIG. 11 the covering means 42 is illustrated having a plurality of elongated rigid elements 68 arranged to form a plurality of accordion-like folds. The terminal fold 72 being connected to the front panel member 10 so as to enable the covering means 42 to be retracted to a position juxtaposed to the sides, top or bottom of said front panel member to gain access to the interior storage area.

Referring to FIGS. 2 and 3 the covering means 42 is illustrated in the form of a flexible sheet 78. In this embodiment, the flexible sheet is flexibly engaged with the front panel member 10 so as to enable the sheet 78 to be lifted to gain access to the interior storage area.

Alternatively, the flexible sheet 78 may be arranged to wind around an axle 72 (FIG. 3) in a series of concentric loops 74 (FIG. 4) in cooperation with a spring retraction mechanism 76 (FIG. 3).

Figure 5A:
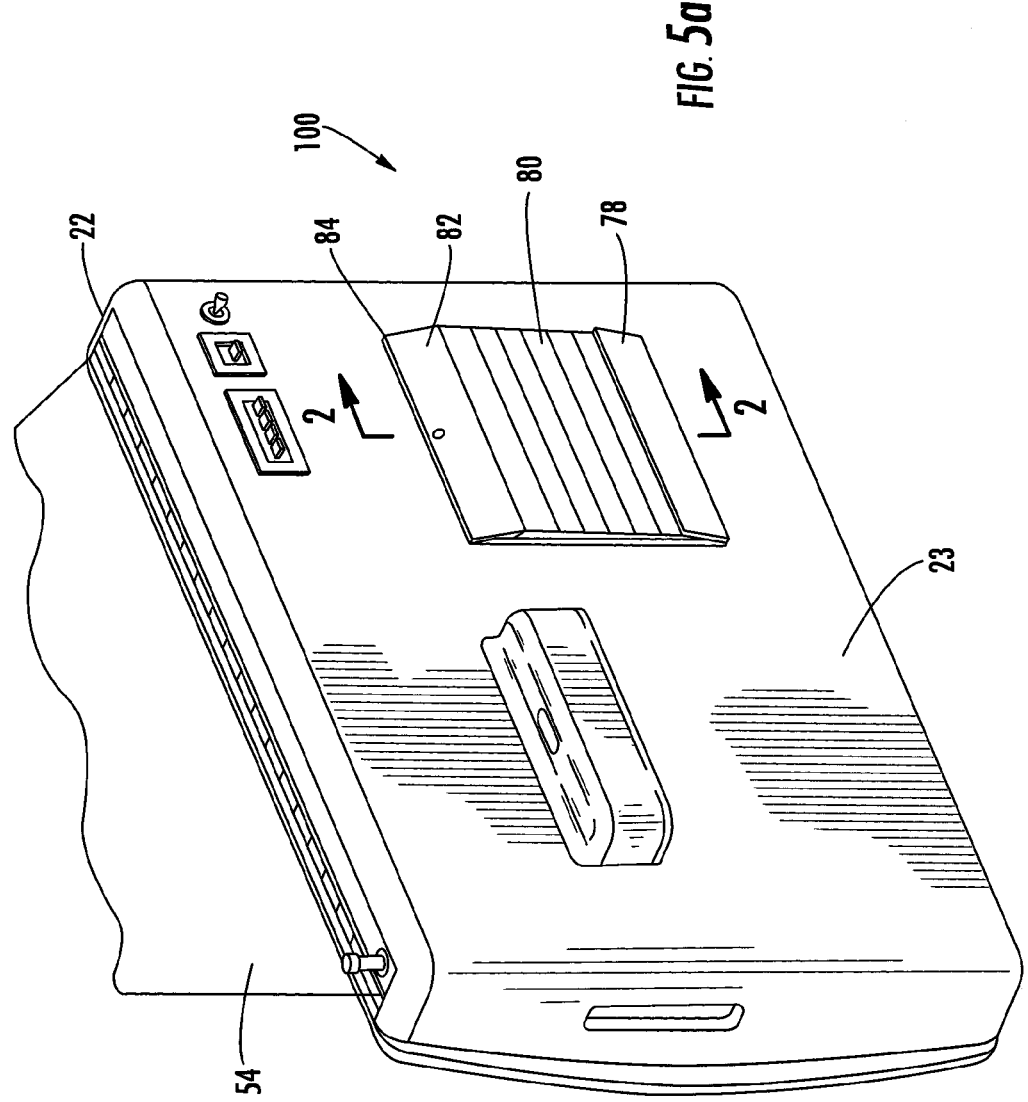
FIG. 5A is a perspective view of an alternative embodiment of the instant invention illustrated secured within a vehicle door.
Figure 5B:
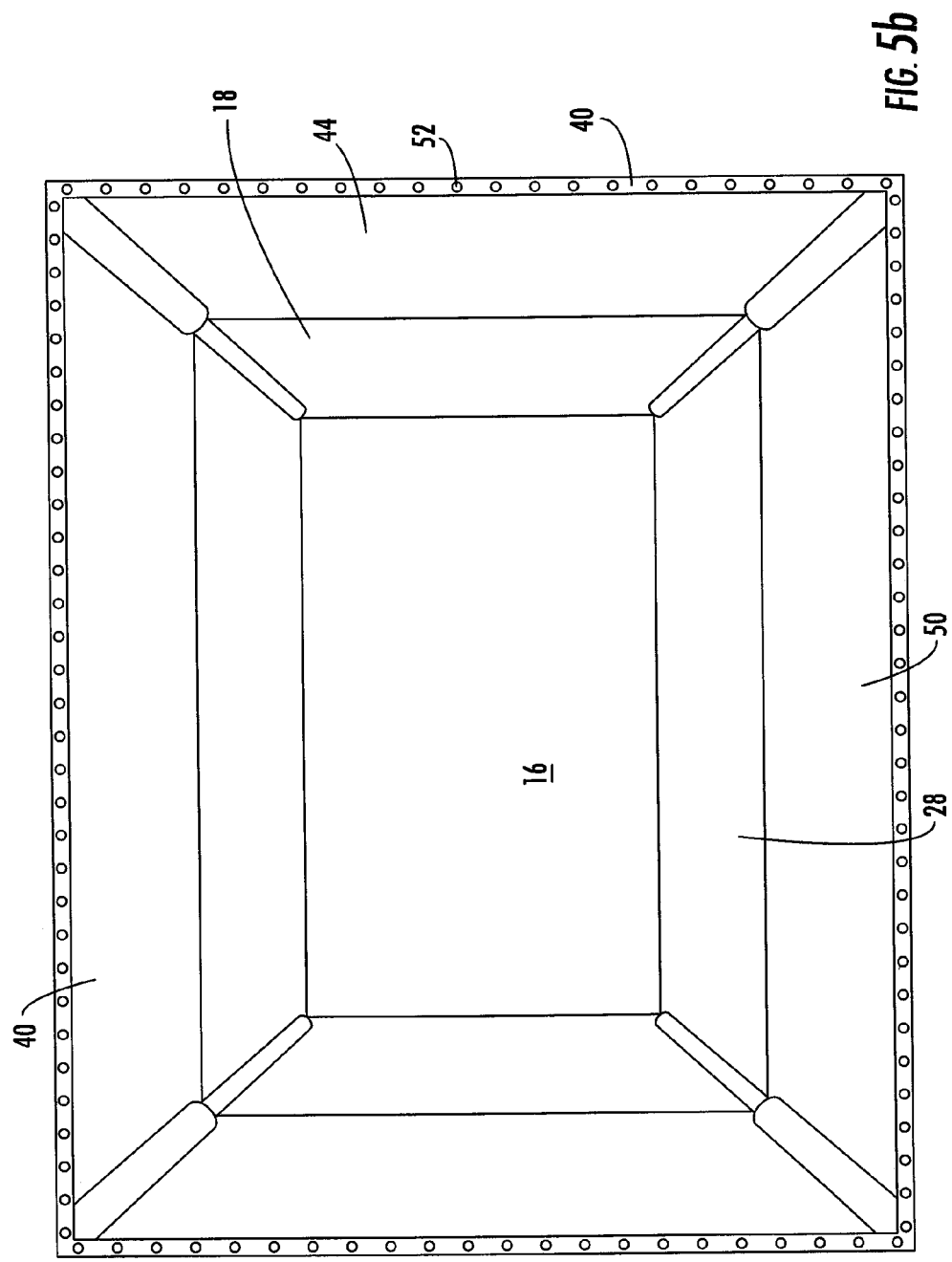
FIG. 5B is a partial front view of the embodiment shown in FIG. 5A illustrated with the front panel removed.
Figure 5C:
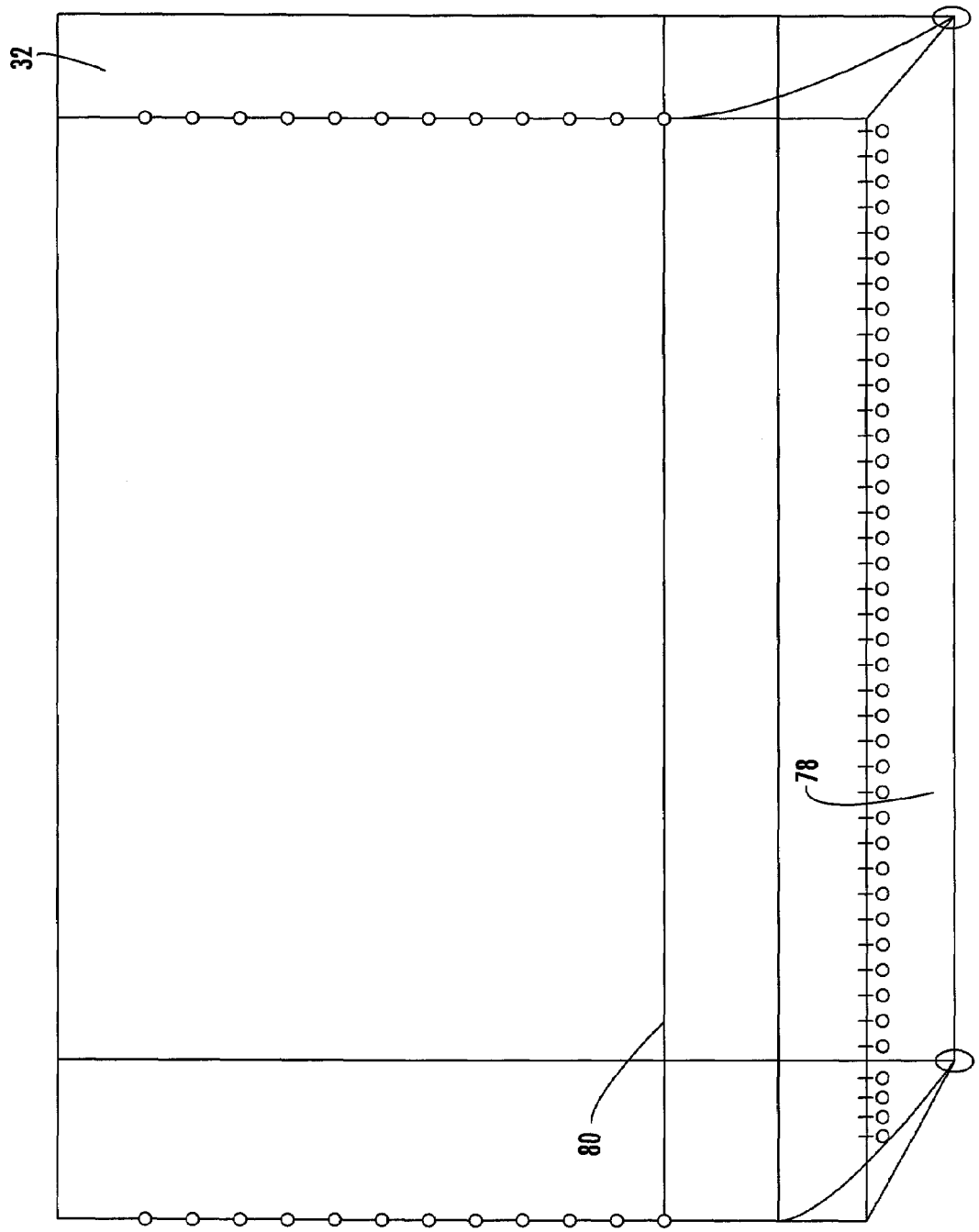
FIG. 5C is a partial perspective view of the embodiment shown in FIG. 5A.
Figure 6:
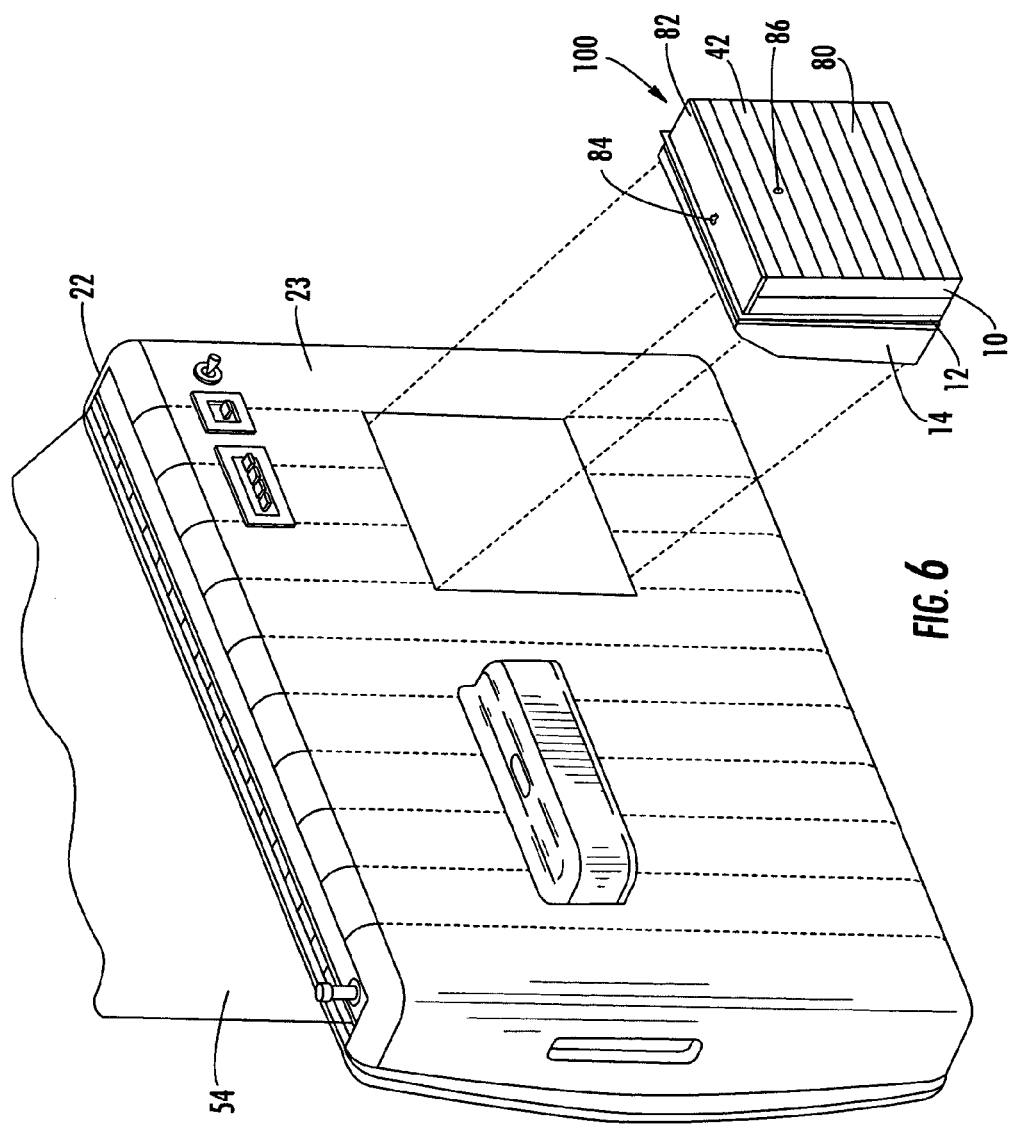
FIG. 6 is a partially exploded view of the embodiment illustrated in FIG. 5.

Referring to FIGS. 5-7 a further alternative embodiment of the covering means 42 is illustrated. In this embodiment the covering means includes a pleated 80 front surface 30 and a lid member 82 to gain access to the interior storage area. The lid member 82 further includes a keyhole slot 84 constructed and arranged to cooperate with a pin member 86 in the front surface 80 and a hingedly connected bottom 78 to allow the front panel member to substantially flattened against the inner door panel 23. Releasing the pin member 86 from the lid member 82 allows the bottom 78 to pivot downwardly thereby increasing the internal storage space.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A dynamic storage compartment adapted for insertion within and upon an interior panel of a vehicle door comprising:

a back panel member having a back surface, opposite sides, a top and a bottom, wherein said sides, top and bottom extend substantially perpendicular to said back surface;

a front panel member having a front surface, opposite sides, a top and a bottom, said front surface having an aperture therethrough;

a center member being constructed and arranged for mechanical engagement within and fixed upon a surface of an inner panel of a vehicle door, said center member having opposite sides, a top and a bottom for connecting peripheral portions of said front and said back panel members so that said panel members face each other to form front and back inner boundaries of an interior portion of said storage compartment, wherein said sides, top and bottom of said back member are constructed and arranged to telescope inwardly and outwardly within said center member, wherein said storage compartment is at least partially recessed within an interior portion of said vehicle door; and whereby attachment of said storage compartment to said vehicle door provides enhanced interior storage for a vehicle.

2. The storage compartment as set forth in claim 1, wherein said front panel member includes a covering means movable between a first open position and a second closed position, wherein said covering means is juxtaposed to said aperture while in said closed position.

3. The storage compartment as set forth in claim 2, wherein said covering means includes a rigid plate, said rigid plate being connected to said front member for pivotal movement between said open and said closed positions.

4. The storage compartment as set forth in claim 2, wherein said covering means includes a plurality of narrow elongated rigid elements flexibly connected in an adjacent relationship, wherein at least one of said narrow elongated rigid elements is flexibly connected to said front panel member.

5. The storage compartment as set forth in claim 4, wherein said elongated rigid elements are constructed and arranged to form a plurality of accordion-like folds, wherein terminal a terminal fold is connected to said front panel member.

6. The storage compartment as set forth in claim 4, wherein said elongated rigid elements are constructed and arranged for winding around an axle in a series of concentric loops.

7. The storage compartment as set forth in claim 6, wherein said axle includes a spring retraction mechanism for retraction and deployment of said covering means.

8. The storage compartment as set forth in claim 1, wherein back panel member includes a means for pressing said back panel member outwardly of said center member and into said door cavity when a window in said vehicle door is moved in an upward direction.

9. The storage compartment as set forth in claim 8, wherein said means for pressing said back panel member outwardly includes at least one spring member.

10. The storage compartment as set forth in claim 1, wherein said vehicle door window cooperates with said back panel member for pressing said back member into said center member during downward movement of said vehicle door window.

11. The storage compartment as set forth in claim 10, wherein said back member includes a ramping surface extending between said top and said back surfaces, wherein said ramping surface is constructed and arranged to cooperate with a lower portion of said vehicle door window for pressing said back member into said center member during downward movement of said vehicle door window.

12. The storage compartment as set forth in claim 1, wherein said sides, top and bottom extend substantially perpendicular to said front surface, wherein said front panel member is constructed and arranged to telescope inwardly and outwardly within said center member.

13. A dynamic storage compartment adapted for insertion within and upon an interior panel of a vehicle door comprising:
- a back panel member having a back surface, opposite sides, a top and a bottom, wherein said sides, top and bottom extend substantially perpendicular to said back surface;
- a front panel member having a front surface including a plurality of pleated folds, opposite sides, a top and a hinged bottom, said top surface having an aperture therethrough;
- a center member being constructed and arranged for mechanical engagement within and upon a surface of an inner panel of a vehicle door, said center member having opposite sides, a top and a bottom for connecting peripheral portions of said front and said back panel members so that said panel members face each other to form front and back inner boundaries of an interior portion of said storage compartment, wherein said sides, top and bottom of said back member are constructed and arranged to telescope inwardly and outwardly within said center member, wherein said storage compartment is at least partially recessed within an interior portion of said vehicle door;
- a lid member hingedly secured to said front panel member and movable between a first open position and a second closed position, wherein said covering element is juxtaposed to said aperture while in said closed position, wherein said lid member includes a keyhole aperture, said keyhole aperture constructed and arranged to cooperate with said front panel member in a lathed position and an unlatched position, wherein said latched position holds said front panel member against said door panel and said unlatched position allows said front panel member to expand inwardly into an interior area within said vehicle, thereby increasing storage space within said storage compartment;
- wherein said vehicle door includes a window, wherein said window cooperates with said back panel member for pressing said back member into said center member during downward movement of said vehicle door window, wherein an item stored in said interior portion of said storage compartment may flex said front panel member into an interior portion of said vehicle when said keyhole aperture is in said unlatched position.

14. A dynamic storage compartment adapted for insertion within and upon an interior panel of a vehicle door comprising:
- a back panel member having a back surface, opposite sides, a top and a bottom, wherein said sides, top and bottom extend substantially perpendicular to said back surface;
- a front panel member having a front surface, opposite sides, a top and a bottom, said front surface having an aperture therethrough, said sides, top and bottom extending substantially perpendicular to said front surface, wherein said front panel member is constructed and arranged to telescope inwardly and outwardly within said center member;
- a center member being constructed and arranged for mechanical engagement within and upon a surface of an inner panel of a vehicle door, said center member having opposite sides, a top and a bottom for connecting peripheral portions of said front and said back panel members so that said panel members face each other to form front and back inner boundaries of an interior portion of said storage compartment, wherein said sides, top and bottom of said back panel member and said front panel member are constructed and arranged to telescope inwardly and outwardly within said center member, wherein said storage compartment is at least partially recessed within an interior portion of said vehicle door;
- a rigid covering element secured to said front panel member and movable between a first open position and a second closed position, wherein said covering element is juxtaposed to said aperture while in said closed position;
- wherein said vehicle door includes a window, wherein said window cooperates with said back panel member for pressing said back member into said center member during downward movement of said vehicle door window, wherein said back panel member cooperates with said front panel member to press said press said front panel member into an interior portion of said vehicle.

* * * * *